United States Patent [19]

Nishihara

[11] Patent Number: 5,050,099

[45] Date of Patent: Sep. 17, 1991

[54] IMAGE DISPLAY DEVICE

[75] Inventor: Toyotaro Nishihara, Hiratsuka, Japan

[73] Assignee: Hitachi, Ltd., Tokyo, Japan

[21] Appl. No.: 556,577

[22] Filed: Jul. 24, 1990

[30] Foreign Application Priority Data

Jul. 27, 1989 [JP] Japan .................................. 1-192516

[51] Int. Cl.[5] .............................................. G06K 15/00

[52] U.S. Cl. ........................................ 364/519; 400/62

[58] Field of Search ................................ 364/518–521, 364/235 MS File, 930 MS File, 840 MS File, 242.5 MS File; 346/154; 358/296; 400/61, 62

[56] References Cited

U.S. PATENT DOCUMENTS 4,713,780 12/1987 Schultz et al. ...................... 364/518

*Primary Examiner*—Arthur G. Evans

*Attorney, Agent, or Firm*—Antonelli, Terry, Stout & Kraus

[57] ABSTRACT

An image display device having print data received from a word processor by a print data receiving circuit, analyzed and written to a display memory. The print data in the display memory is colored and edited for desired color display on a CRT unit using data from a color register and a window generating circuit the edited print data is stored in memory.

10 Claims, 6 Drawing Sheets

FIG. 2
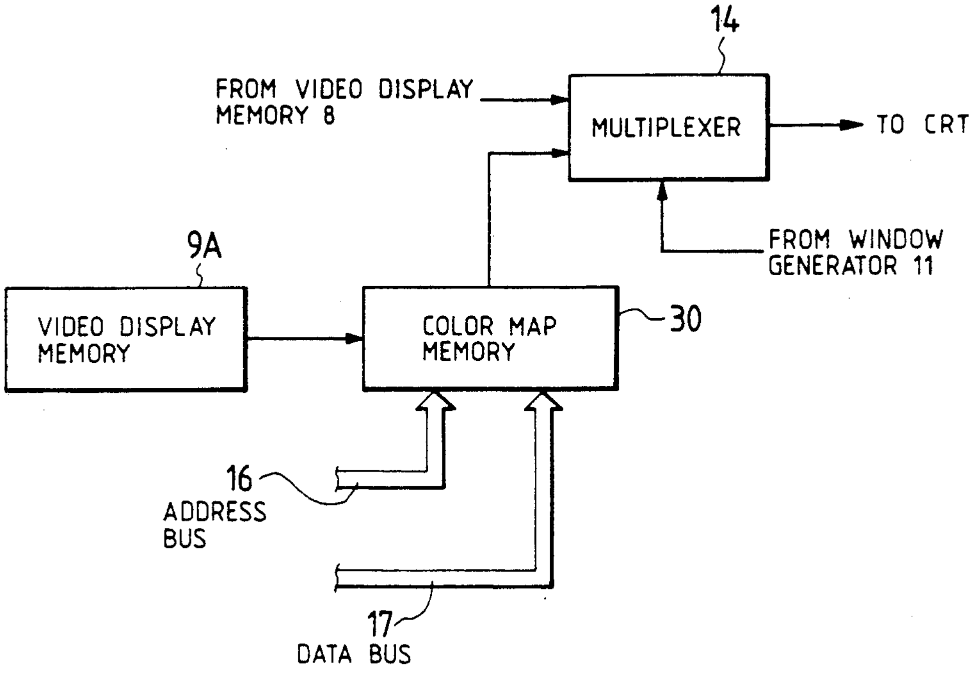
FIG. 4A
FIG. 4B
FIG. 4C
FIG. 4D
FIG. 4E
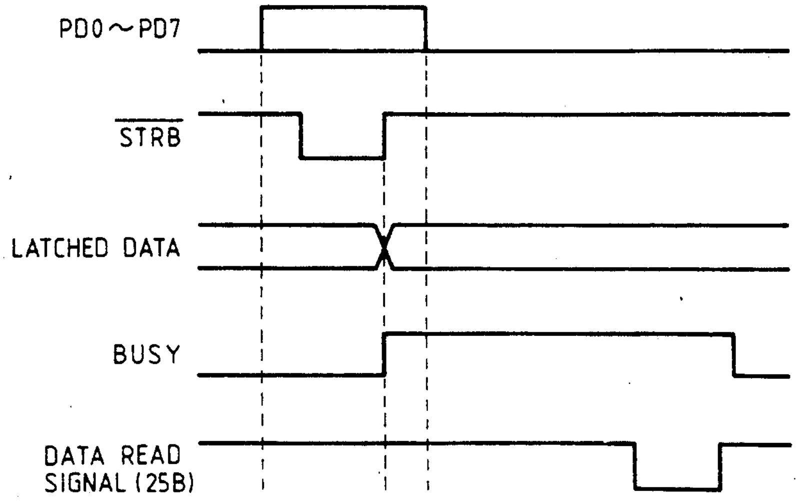

IMAGE DISPLAY DEVICE

BACKGROUND OF THE INVENTION

The present invention relates to an image display device which displays data on a CRT screen or the like in the same format as that of printing on paper the data being output by word processing apparatus known as a word processor primarily for printing on a printer.

In recent years, word processors and DPT (desk-top publishing) systems have received widespread use for preparing and editing documents. The format of final output from these apparatus is that of printing on a printer. For this reason, the representative prior art image display device showing character-filled screens does not use the print data unchanged as output by the word processor for preparing and displaying character screens. (Incidentally, the prior art image display device typically comprises a CPU (central processing unit), a display memory and a CRT unit. In operation, display data is admitted into the display memory, to be retrieved therefrom for display on the CRT unit.)

SUMMARY OF THE INVENTION

It is therefore an object of the present invention to provide an image display device having a print data receiving circuit which receives print data from a word processor, analyzes the data, writes the data into a display memory, and displays the data on a CRT screen.

In carrying out the invention, there are provided the print data receiving circuit mentioned above and a control means. The print data receiving circuit receives the data output by the word processor for printing on a printer. The control means controls reception of the print data by the print data receiving circuit, analyzes the received print data, and controls writing of the print data into the display memory based on the analysis thereof.

The word processor for use with this invention is not one of having a printer incorporated therein but one of being connected to a printer via a cable. With the print data output terminal of the word processor connected by cable to the print data receiving circuit, the image display device according to the invention receives previously prepared character screen data from the apparatus and outputs the data as print data.

The print data is output in what is known as parallel data transfer in units of bytes. That is, when one byte of data is transferred from the word processor, the print data receiving circuit receives the data. At this point, the control means sends to the word processor a signal that causes it to stop the next transfer of data. The data received by the print data receiving circuit is analyzed by the control means. If it is found through the analysis that the data constitutes a control code such as one for moving the printing head or one for changing the font on the printer, parameters are set or changed or other necessary adjustments are made so as to write to the display memory the character pattern data corresponding to these printer controls, the character pattern data being generated by a character pattern generator. If the data turns out to be a character code, the character pattern data corresponding to the code is transferred from the character pattern generator to the display memory. If the data is found to be pattern data, i.e., the data representing a character or a figure, the data is written without intervention to the display memory.

When the above-described process of the received data is completed, the next byte of data is likewise admitted for another cycle of processing. With the process repeated, the character screen data that comes from the word processor as print data may be displayed on the image display device in the same format as that for printing on a printer.

BRIEF DESCRIPTION OF THE DRAWINGS

FIG. 2 is a block diagram showing major components of a variation of the preferred embodiment;

FIGS. 4A, 4B, 4C, 4D and 4E are signal timing charts of print data handled by the embodiment;

DETAILED DESCRIPTION OF THE PREFERRED EMBODIMENT

Figure 1:
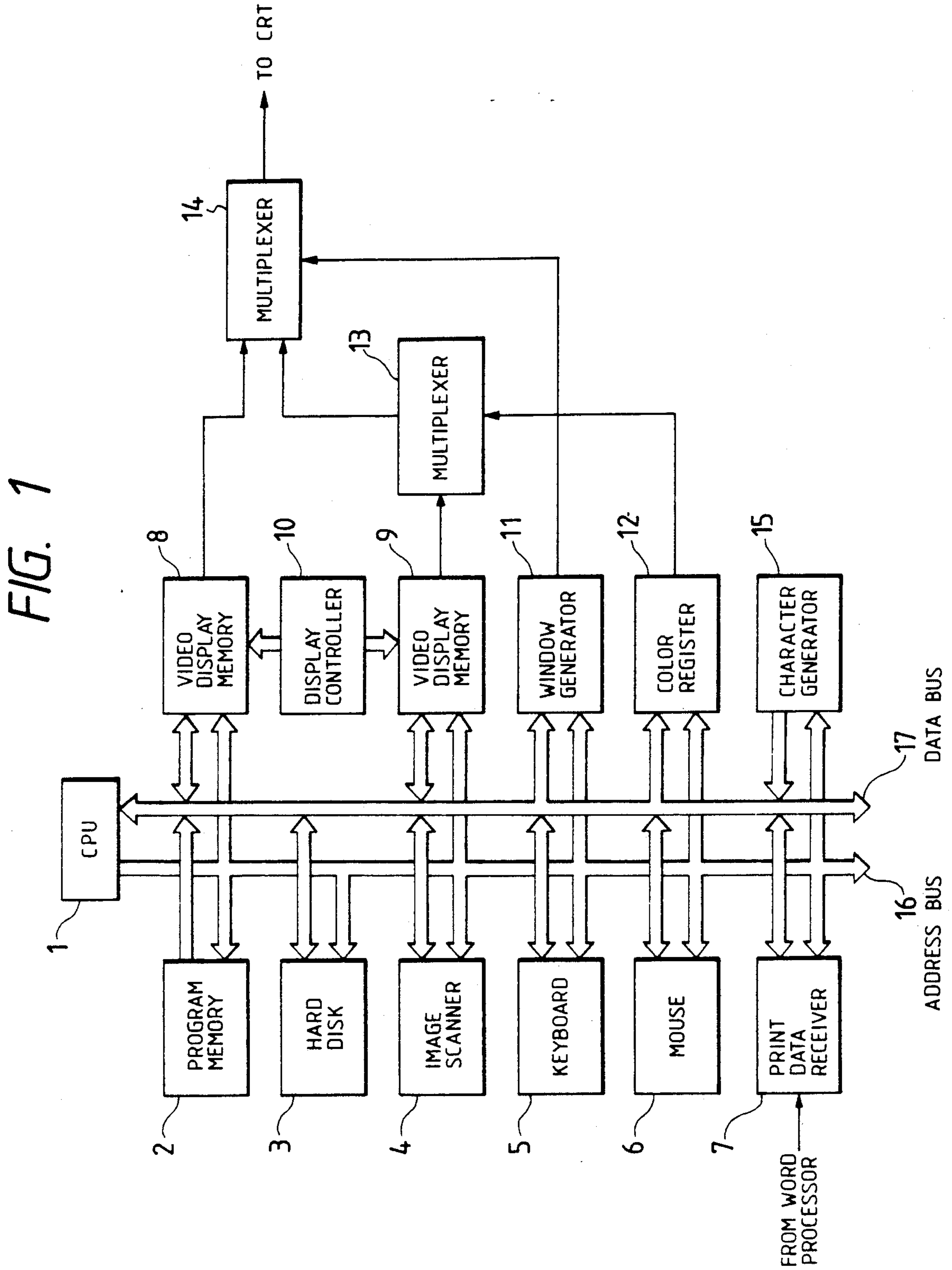
FIG. 1 is a block diagram of a preferred embodiment of the present invention.

The preferred embodiment of the present invention will now be described by referring to the accompanying drawings. FIG. 1 shows the embodiment in block diagram format.

In FIG. 1, reference numeral 1 is a central processing unit (CPU); numeral 2 is a program memory that contains a processing program; numeral 3 is a hard disk (e.g., optical disk) on which to record image data; numeral 4 is an image scanner that gets image data from natural images (e.g., color pictures) and other sources; numeral 5 is a keyboard; numeral 6 is a mouse; numeral 7 is a print data receiving circuit; numeral 8 is a first display memory which, having eight bits of red, green and blue each assigned per pixel, stores the image data of natural images in color; numeral 9 is a second display memory which, having one bit assigned per pixel, stores character screen data; numeral 10 is a display memory reading circuit that reads the contents of the first and second display memories 8 and 9; numeral 11 is a window generating circuit; numeral 12 is a color register that records the color data for specifying character and background colors when the recorded character screen data is placed in the second display memory 9; numeral 13 is a color switching circuit that outputs one-bit-per-pixel data read from the second display memory 9 and converts the data into coloring data for output in accordance with the color data read from the color register 12; numeral 14 is a switching circuit which, according to a window signal (signal for specifying a window-like frame on the screen) from the window generating circuit 11, switches natural image data and character screen data for display on a display unit such as a CRT unit, not shown, the natural image data being forwarded from the first display memory 8, the character screen data being sent from the second display memory 9 via the color switching circuit 13; numeral 15 is a character pattern generator; numeral 16 is an address bus; and numeral 17 is a data bus. Other circuits not directly relevant to the present invention are omitted from FIG. 1.

With the image display device of FIG. 1, natural image data is admitted through the image scanner 4 and stored into the first display memory 8, and character screen data is transferred from a word processor, not shown, via the print data receiving circuit 7 and placed in the second display memory 9. Either or both of the image data and the character screen data are edited in layout or otherwise modified by the mouse 6 and other appropriate means. When a desired screen is obtained following these manipulations, the hard disk 3 receives for recording thereon the natural image data retrieved at that time from the first display memory 8, the character screen data from the second display memory 9, the window position data from the window generating circuit 11, and the character and background color data from the color register 12, along with the number and keyword which are assigned to that screen and which are entered from the keyboard 5.

A large number of the screens obtained in the above-described manner are recorded on the hard disk 3. Desired screens are retrieved as needed from the disk by use of screen numbers or keywords. On retrieval, the hard disk 3 permits transfer of the natural image data of the desired screen to the first display memory 8, the character screen data to the second display memory 9, the window position data to the window generating circuit 11, and the character and background color data to the color register 12. These pieces of data are used to reproduce the desired screen on the display unit.

FIG. 2 illustrates in block diagram format major parts of one variation of the preferred embodiment shown in FIG. 1. In FIG. 2, a display memory 9A has a plurality of bits assigned to each pixel thereof to form a data configuration allowing each pixel to display multiple colors. A color conversion circuit 30 admits data from the display memory 9A in accordance with the settings forwarded via the address bus 16 and data bus 17 from the CPU 1, the data being subsequently converted in terms of display color for output.

Referring to FIG. 1, as shown in FIG. 2, the display memory 9 may be replaced by the display memory 9A which is connected to the switching circuit 14 via the color conversion circuit 30. In this setup, pixel data is read from the display memory. If it is found that the pixel data specifies printing in a color other than black, the color conversion circuit 30 is set by the CPU 1 so that the specified print color is output unchanged as the display color. If the pixel data is found to specify printing in black or to designate a background with no printing specified thereto, the color conversion circuit 30 is set by the CPU 1 so that any desired display color is output. In this manner, the variation of the embodiment enhances the ease of use of the image display device.

What follows is a more detailed description of how the print data receiving circuit 7 in the image display device of FIG. 1 is constructed, and how control is provided over reception and analysis of print data and over writing of the data to the display memories based on the result of the analysis.

Figure 3:
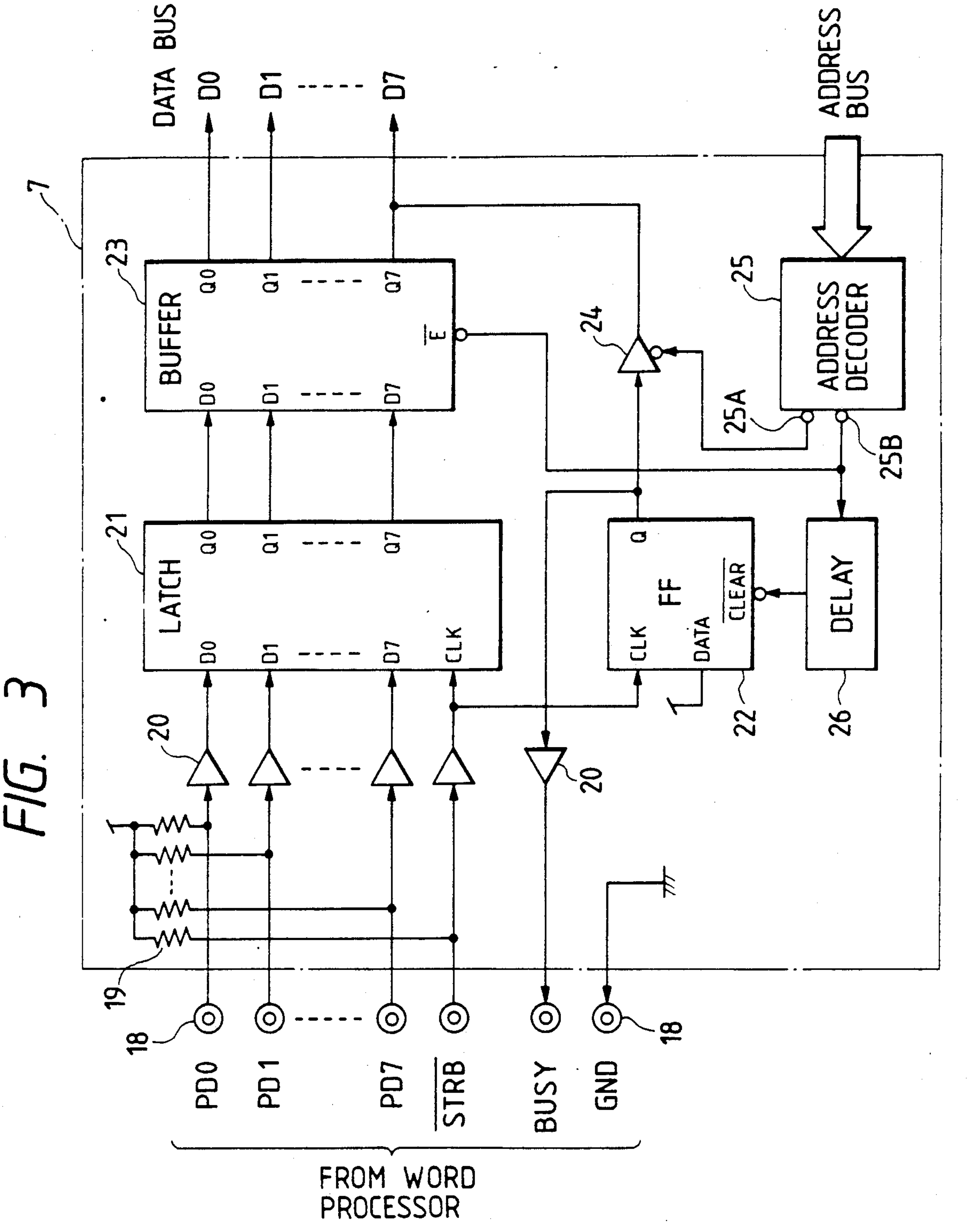
FIG. 3 is a detailed view of a print data receiving circuit used in the preferred embodiment.
Figure 5A:
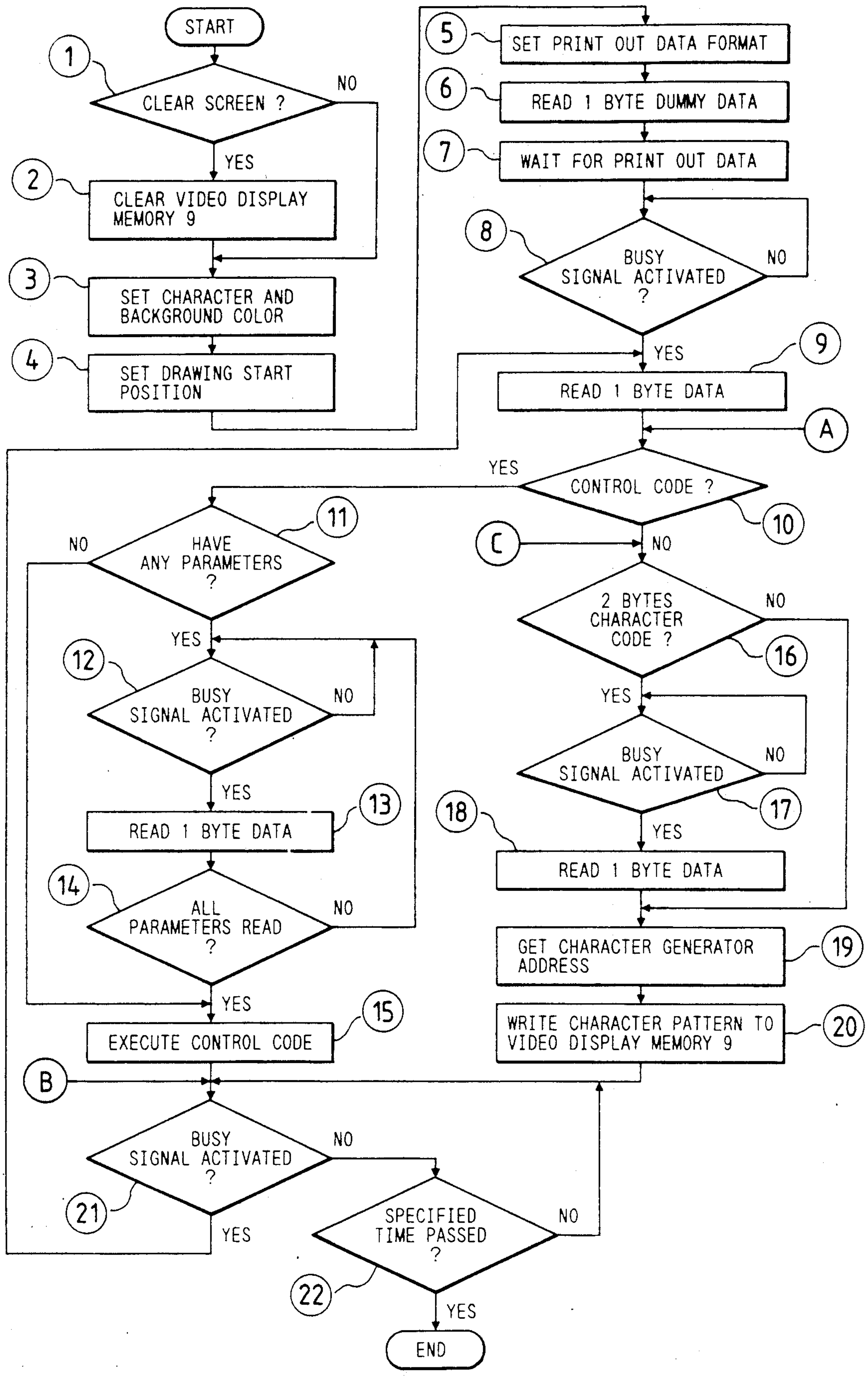
FIGS. 5A and 5B are flowcharts of the control processing applicable to the embodiment.

FIG. 3 shows in detail the print data receiving circuit 7 in FIG. 1. FIGS. 4A, 4B, 4C, 4D and 4E are timing charts that apply when the print data is received. FIG. 5A depicts in flowchart format how the print data is controlled by the program stored in the program memory 2 of FIG. 1.

In FIG. 3, reference numeral 18 is a group of cable connecting terminals; numeral 19 is a group of pull-up resistors; numeral 20 are buffers; numeral 21 is a group of latches that latch eight-bit parallel data; numeral 22 is a flip-flop; numerals 23 and 24 are tri-state buffers; numeral 25 is an address decoder; and numeral 26 is a delay circuit. Address enable and other signals necessary for the address decoder 25 are omitted from FIG. 3.

As shown in FIGS. 4A, 4B, 4C, 4D and 4E, when print data is to be output from the word processor, eight-bit parallel data (PDO-PD7 in FIG. 4A) is first output, followed by the output of a strobe signal ($\overline{STRB}$ in FIG. 4B). The print data receiving signal 7 has the latches 21 latch the strobe signal $\overline{STRB}$ as a clock signal, i.e., as one-byte data (PDO-PD7). Simultaneously, the flip-flop 22 is set by the same strobe signal $\overline{STRB}$.

FIG. 4C illustrates the data latched by the latches 21, and FIG. 4D depicts an output Q (busy signal) of the flip-flop 22 that has been set. The output Q of the flip-flop 22 is sent unchanged to the word processor as the busy signal causing the apparatus to stop data transfer of the next byte. Because the busy signal is also connected to one of the lines (D7) constituting the data bus via the tri-state buffer 24, the CPU 1 of FIG. 1 can monitor the status of the busy signal.

When the CPU 1 is to monitor the busy signal, it transmits a predetermined address to a first output terminal 25A of the address decoder via the address bus 16. This address, decoded by the address decoder 25, causes an output to develop at the first output terminal 25A. The output causes the tri-state buffer 25 to conduct, which in turn allows the CPU 1 to monitor the status of the busy signal via the data bus D7.

After the CPU 1 verifies in this manner that the busy signal is set, the CPU 1 transmits another predetermined address to a second output terminal 25B of the address decoder 25 via the address bus 16. This address, decoded by the address decoder 25, causes an output to occur at the second output terminal 25B. The output causes the tristate buffer 23 to conduct, which in turn allows the CPU 1 to read from the latches 21 the one-byte print data output via the buffer 23 and the data bus DO-D7.

The output for reading data (i.e., the output developed at the second output terminal 25B, shown in FIG. 4E) is delayed by the delay circuit 26. Then the output is applied to a CLEAR terminal of the flip-flop 22, resetting the output Q thereof. This releases the busy signal and constitutes a request that the word processor transfer the next byte of data.

Some word processors ascertain that the printer has actually received the data using an acknowledge signal in addition to the data, strobe and busy signals of FIGS. 3 and 4A-4E. Where such a word processor is configured, all that needs to be done is to supplement the cable connecting terminals 18 with an acknowledge signal terminal, and to provide the acknowledge signal by returning the data read signal at a suitable timing.

It is also apparent that the functions of the latches 21, buffer 23, flip-flop 22 and buffer 24 are also implemented using a parallel interface-dedicated LSI arrangement.

Referring to FIG. 5A, there will now be described how the control means provides control over reception and analysis of the print data output from the word processor, as well as over writing of the data to the second display memory 9 as character pattern data.

Before print data is input as character pattern data, the user is asked in step 1 to determine whether or not to clear the currently displayed character screen to make room for a character screen to be input anew. If the user chooses to clear the currently displayed screen, that screen is cleared from the second display memory 9 by operation of the keyboard 5 in step 2.

The user is then asked in step 3 to enter through the keyboard 5 the character and background colors in which to display the print data as a character screen; the data representing the input colors is set to the color register 12. The character screen data, i.e., the received print data, is written to the second display memory 9. In step 4, the user is asked to enter through the keyboard 5 a desired display start position in screen coordinates, write the position to a character pattern, not shown, and set the pointer to that input value.

In step 5, the user is asked to enter through the keyboard 5 the type of printer specified by the word processor connected to the image display device so that a code table for use upon input data analysis is established. In step 6, one-byte dummy data is read to clear the output of the flip-flop 22, i.e., the busy signal whose status at this point is unpredictable. In step 7, a message is displayed indicating that the word processor is allowed to output print data as character screen data; reception of the print data is started.

In step 8, the output Q of the flip-flop 22 is monitored. If the output (i.e., the busy signal) is found to be set, one-byte data is read in step 9 from the buffer 23 as described above. In step 10, a check is made to see if the data thus read is a control code of 1F (hex) or smaller, or a character code of greater than 20 (hex). If the data turns out to be a control code, step 11 is reached. In step 11, a check is made to see if the control code has a parameter (i.e., if the control code specifies a character size, the size accompanies the code as a parameter). If the control code does have a parameter, the data represented by that parameter is received in steps 12, 13 and 14, in the same manner as in steps 8 and 9. After this, the control code is matched with appropriate processing in step 15. For example, a control code for printing head movement allows the pointer to move so as to write the character pattern to the second display memory 9, and a control code for changing the font or altering the character size requires the corresponding control parameter to be modified accordingly.

If the data received in step 9 turns out to be a character code, step 16 is reached. In step 16, a check is made to see if the character code is a two-byte kanji code; if it is, another byte of data is received in steps 17 and 18. In step 19, the start address of a character pattern corresponding to the character code received is obtained, the character pattern being located in the character pattern generator 15. In step 20, the character pattern read from the character pattern generator 15 is written to the second display memory 9, and the corresponding character is displayed on the screen. When the processing of the received control code or character code is completed, step 21 is reached. In step 21, the busy signal, i.e., the output of the flip-flop 22, is monitored in preparation for receiving the next data. If the busy signal is found to be set, step 9 is reached again and the subsequent steps are repeated.

The steps are thus repeated so that the character screen data in the form of print data from the word processor is written to the second display memory 9 and displayed on the screen. If the busy signal is not found to be set in step 21 after a predetermined period of time (e.g., 5 seconds) has elapsed, it is concluded that print data output from the word processor has come to an end, and the whole process is terminated.

In the process flow of FIG. 5A, one byte of data is received at a time for the analysis and processing thereof. An alternative to this scheme is to write the received data consecutively to a main memory, not shown in FIG. 1, until all data has been output by the word processor, so that the character screen data may be read thereafter from the main memory for writing to the second display memory 9.

Also in the process flow of FIG. 5A, it is indicated in steps 21 and 22 that the reception of the print data comes to an end if the busy signal is not set within a predetermined period of time. However, some word processors transmit a special control code or a combination of such codes at the end of the print data they output. Where such a word processor is configured, the detection of the control code or codes may be used alternatively to terminate the processing. Another alternative is that step 22 is carried out after the receipt of the control code or codes, the processing being terminated following the confirmation that no further data has arrived after a predetermined period of time. A further alternative is to have a check made to see if a predetermined key operation is made by the user on the keyboard 5 to terminate the processing, whereby step 15 is bypassed.

The processing of FIG. 5A is primarily designed to be part of the main program or a subroutine thereof for editing the entered character screen data in layout. Alternatively, the processing of FIG. 5A may be implemented in an interruption scheme. With the character screen data output by the word processor, the transfer of the first byte of the data interrupts the CPU 1. During the interruption, the processing of FIG. 5A is executed.

With the interruption scheme mentioned above, the print data receiving circuit 7 of FIG. 3 converts the polarity of the busy signal output by the flip-flop 22 to the desired polarity via a gate circuit, the circuit allowing its gates to be controlled by the CPU 1. The busy signal thus manipulated is used as an interruption signal to be applied to an interrupt terminal of the CPU 1. When the CPU 1 is interrupted by transfer of the first byte of the print data, the CPU 1 controls the gate circuit to inhibit interruption by the busy signal. Subsequent reception of the data is executed as described in FIG. 5A. In this manner, the character screen data may be received.

With the character screen data output for printing, characters are all transmitted in codes. However, some word processors output character data or figure data to be printed by use of vector fonts. This type of word processor internally develops characters and figures into bit images using the vector fonts. The bit image data is output as parameters of control codes for specifying bit image printing, the control codes being transmitted along with the data.

In the case above, the character pattern data is written to the second display memory 9 in step 15 of FIG. 5A, i.e., in the process where the control code specifying bit image printing is executed.

Referring to the flowchart of FIG. 5B, there will now be described the scheme wherein the word processor outputs its print data using vector fonts. In connection with this scheme and prior to the description thereof, a typical parameter structure of the control code for specifying bit image printing will be mentioned in passing by referring to FIGS. 6A and 6B.

Figure 6A:
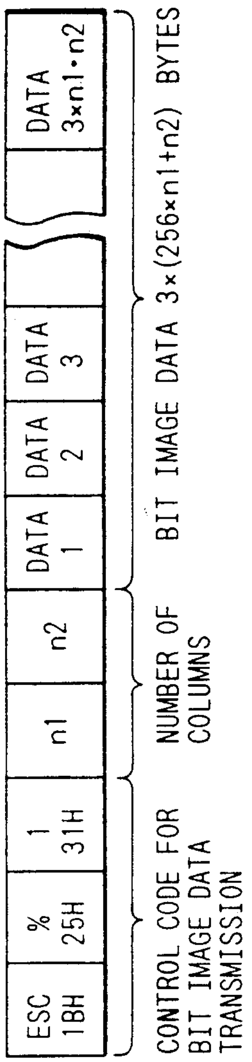
FIGS. 6A and 6B are views depicting how the print data is structured.
Figure 6B:
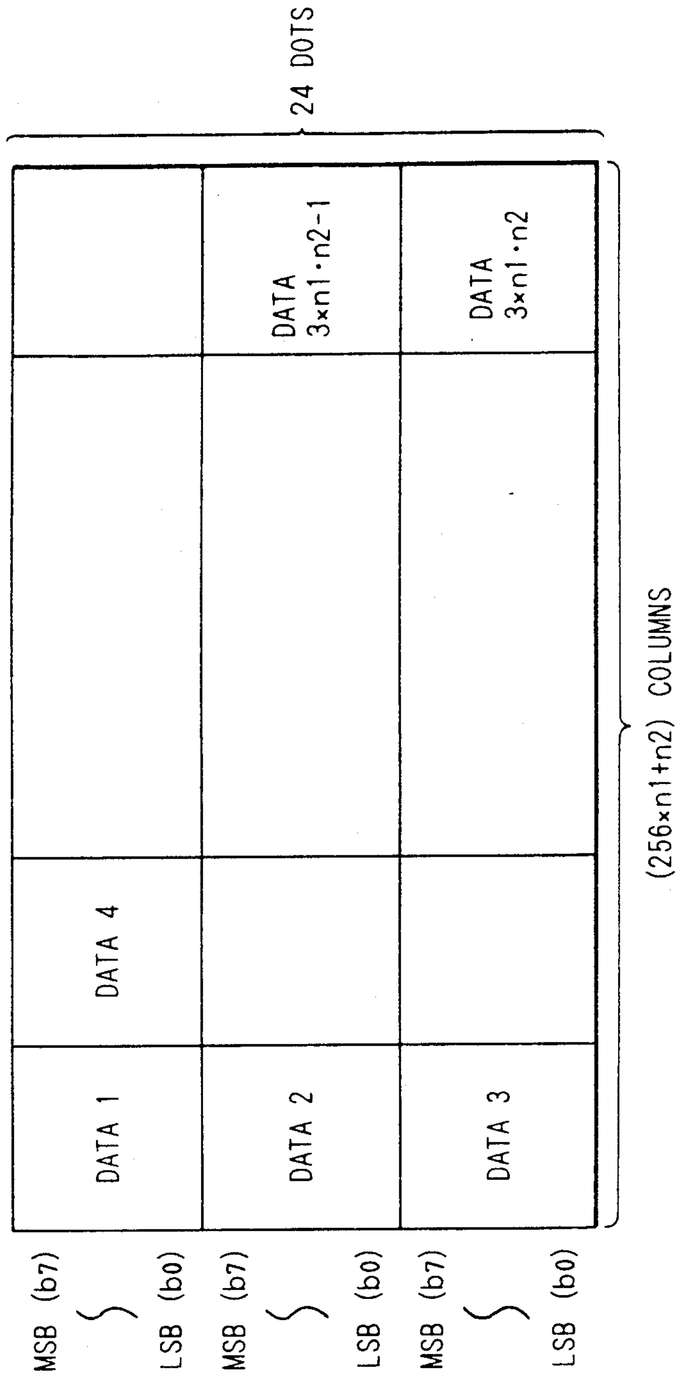

As shown in FIG. 6A, the two bytes comprising % (hexadecimal 25) and 1 (hexadecimal 31) following the control code ESC (hexadecimal 1 B) specify that the data subsequent thereto is to be bit image print data. The next two bytes containing n1 and n2 indicate the amount of the subsequent bit image data in terms of dot columns. The data comprising n1 and n2 is followed by the bit image data sent by the work processor. As shown in FIG. 6B, the bit image data is constituted successively through vertical scanning, beginning in the top left corner of the print screen.

Figure 5B:
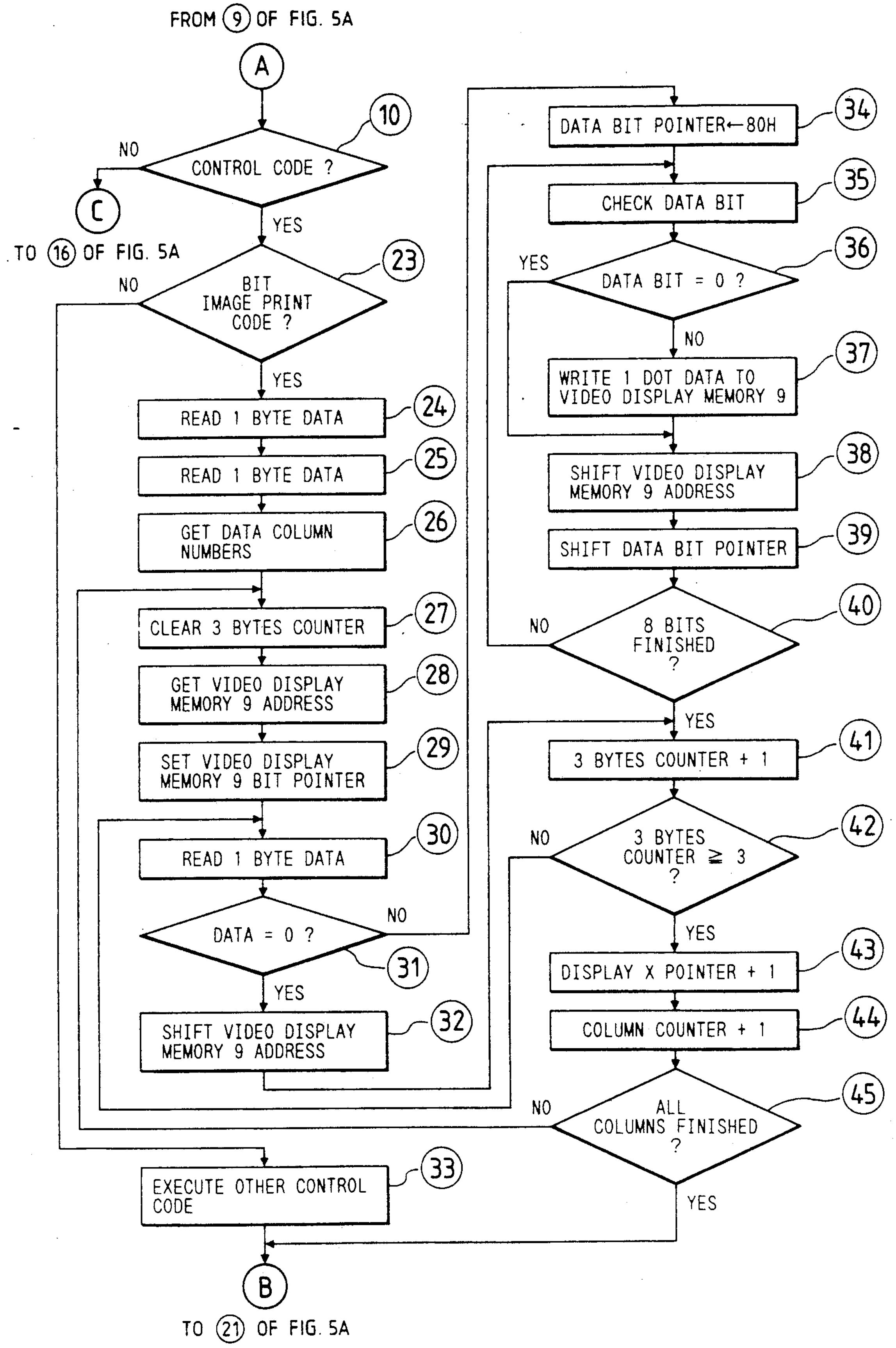

Referring to FIG. 5B, the process flow described therein is actually a modification of the process flow in FIG. 5A, the description of the modification centering on how the control code for specifying bit image printing is executed in steps 9 through 21 of FIG. 5A. Steps 24, 25 and 30 in FIG. 5A are the steps wherein one byte of print data is read from the buffer 23 of FIG. 3. In practice, as with step 9 of FIG. 5A, these steps must be preceded by another step (8 or 21 in FIG. 5A) in which a check is made to see if the busy signal is set. The description of the step is omitted to avoid descriptive duplication.

In step 9, one byte of print data is received from the buffer 23. In step 10, a check is made to see if the received print data turns out to be a control code equal to or smaller than 1 F (hex). In case of a control code, step 23 is reached. In step 23, a check is made to see if the control code is an escape code (hexadecimal 1 B) for specifying bit image printing followed by two bytes comprising a % code (hexadecimal 25) and a 1 code (hexadecimal 31), a graphic description of the code structure being omitted from FIG. 5B for simplicity. If the control code is found to be one for specifying bit image printing with the necessary attachments, step 24 and the subsequent steps are carried out.

The two bytes of dot column count data n1 and n2 are received in steps 24 and 25. In step 26, a column counter that counts the number of times the subsequent steps are repeated is cleared.

Thereafter, the print data (bit image data) is received and placed in the second display memory 9 for display. This process is carried out in units of three bytes, i.e., one column of print data. That is, in step 28, the address of the second display memory 9 to which to write the first dot of one column of data is set. In step 29, a bit pointer indicating the bit to which to write the dot of the received data is set, the bit pointer being obtained from another pointer indicating the X display/write coordinate position of the dot position.

In step 30, three bytes of bit image data are consecutively received, the dot data thereof being prepared for writing to the second display memory 9. In step 31, a check is made to see if the received data turns out to be zero. If the data is found to be zero, no data is written to the second display memory 9. Instead, the address of the memory 9 to which data is supposed to be written is shifted down by eight lines. This makes it possible to speed up the write operation to the second display memory 9 and to overwrite data on the same byte therein.

If the received data is found to be other than zero in step 31, the data is checked bit by bit starting from the most significant bit (MSB) at the top of the print screen. Depending on the result of this check, the received data is written to the second display memory 9. To do this requires setting beforehand a data bit pointer specifying one bit in the one-byte received data to 80 (hex) in step 34. In step 35, the received data is AND'ed with the data bit pointer. In step 36, a check is made on the applicable bit of the data. If the bit is not zero, i.e., if the bit represents a dot to be printed, a "1" is written in step 37 to a bit position in the second display memory 9, the address of the position being determined beforehand in step 29.

If there is no circuit by which to write data to a desired bit within one byte in the second display memory 9, it is necessary for the CPU to read the byte data, set the applicable bit by OR'ing it, and write the resulting byte data to the initial address.

If the check in step 35 on one bit of the received data shows the bit to be zero in step 36, no data is written just as with the byte data mentioned above.

When the processing of one bit in the received data is completed, the address of the second display memory 9 is shifted down by one line of the screen in step 38. In step 39, the data bit pointer specifying the bit in the received data is shifted by one bit toward the least significant bit (LSB) side. Steps 35 through 38 are repeated for each of the eight bits making up one byte data, until a repeat count of eight is reached in step 40.

When the processing of the received data is completed, the next byte data is admitted in step 30. Steps 31 through 40 are repeated for three bytes of received data corresponding to the 24 dots constituting one column on the print screen. When the steps are repeated three times, the processing of the three-byte bit image data comes to an end (in steps 41 and 42). Thereafter, the next column of data is subjected to the same processing. In step 43, the pointer indicating the X display/write coordinate position is updated to indicate the next pixel. In step 44, the counter counting the number of dot columns of received data is incremented by 1. The above process is repeated for all dot columns specified in step 26, i.e., until all columns are found to be finished in step 45.

When the processing of all dot columns is completed, the steps from 21 on in FIG. 5A are repeated to receive and process the next data.

In FIG. 5B, one byte or one bit of data is not written to the second display memory 9 if found to be zero in step 31 or 36, respectively. Alternatively, zero data may be written to an appropriate bit position of the second display memory 9. In this case, too, the absence of a circuit by which to write one bit of one byte to a position in the memory 9 requires that the CPU 1 read the byte data, clear the applicable bit by AND'ing it, and write the resulting byte data to the initial address.

In the description above, the second display memory 9 of FIG. 1 has one bit assigned per pixel and allows one color to be used per screen. Alternatively, a plurality of bits (typically 3 or 4 bits) may be assigned to each pixel for multiple color representation thereby. In this case, a display data output circuit of the second display memory 9 may be equipped with a color conversion memory, the so-called look-up table, to which the CPU 1 may write data freely so that display colors may be changed as desired.

Where the image display device is capable of multiple color representation on the character screen, a word processor capable of color editing may be configured. In this case, the word processor outputs data which is turned to a color character screen, the data being originally destined for printing in color on a color printer. This simply requires writing data in step 20 of FIG. 5A to the second display memory 9, the data corresponding to the character color currently specified.

An alternative to the above scheme is to provide a character color register (different from color register 12) to which the CPU 1 writes a character pattern on a one-pixel-to-one-bit basis, the pattern data being automatically written in the depth direction per pixel of the second display memory 9. Every time a control code specifying a color is received, the character color register is set with corresponding data.

In displaying the bit image data as depicted in FIG. 5B, it is evident that the same processing as above may be performed where color specification is made by a control code specifying a color. However, some word processors output color bit image data for printing, not by using a color-specifying control code but by dividing the bit image data into four components, yellow, magenta, cyan and black, the color components being sent out successively. Given such print output data, the second display memory 9 has the four color components assigned to each bit, four bits being assigned to one pixel. In this case, the second display memory 9 may have its display data output circuit equipped with the above-mentioned color conversion memory. Every time bit image data of each component is received, simply writing the data to the corresponding bit position in the depth direction of the second display memory 9 permits the display of a color character screen as specified by the print output data.

As a variation of the case above, color character screens may also be displayed as follows: The second display memory 9 may have three bits assigned to each pixel and may be equipped with the color conversion memory. In this setup, the bit image data representing each of the color components of yellow, magenta and cyan is assigned one of three bits in the depth direction of the second display memory 9. Every time the bit image data of one component is received, the data is written to the bit corresponding to that component. The bit image data representing the black component is written to all three bits in the depth direction of the second display memory 9.

Color print data of characters is most often output for printing in black on white sheets of paper. When the image display device faithfully reproduces color print data, the characters and figures specified for printing in black are displayed in black, the background thereof being displayed in white. However, it is often the case with the color CRT unit that characters are displayed in white and the background is displayed in black or blue. This is accomplished by simply having the color conversion memory convert the black component or a bit combination corresponding to black into, say, white as specified and the zero-bit input corresponding to the background into, say, blue as specified, the yellow, magenta and cyan components being treated the same as before.

Another variation is to have the user specify whether the black characters and the white background are to be displayed unchanged or to be converted to other desired colors for display.

It has been found that the image display device according to the present invention takes data from word processing apparatus such as word processors, DPT systems and personal computers and displays the data as character screens with minimal intervening processing. One advantage of this image display device is the increased efficiency in preparing character screen data.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. An image display device comprising:

data input means for inputting character and figure data, said data input means includes a print data receiving circuit for receiving print data from an external word processing means;

display memory means for storing said input data;

memory means for storing screen data, said screen data being edited or otherwise modified input data from said display memory means;

display means for displaying the data stored in said memory means; and control means for controlling said data input means including said print data receiving circuit, said display memory means, said memory means and said display means, said control means providing controls for analyzing said print data received by said print data receiving circuit and for writing said received print data to said display memory means in accordance with the result of said analysis of said received print data.

2. An image display device according to claim 1, wherein the data received by said print data receiving circuit constitutes color print data, said data comprising a component for specifying printing of characters in black and a component for specifying printing of a background in white, said device further comprising means for converting said components to desired colors for display on a screen.

3. An image display device according to claim 1, wherein current input data stored in said display memory means is erased prior to having said print data receiving circuit receive print data from said external word processing means.

4. An image display device according to claim 1, further comprising a color conversion circuit for storing a plurality of colors and selecting a color therefrom as desired, said color conversion circuit selecting in advance any of two colors, one color corresponding to a print dot part of print data representing one of a character and a figure, the other color corresponding to the remaining background part of said print data, said print data being forwarded from said word processing means.

5. An image display device according to claim 1, wherein said control means sets beforehand coordinates in said display memory means, said coordinates representing an address to which said control means starts writing data received from said word processing means, said data being subsequently retrieved for display.

6. An image display device according to claim 1, wherein a check is made on said print data being analyzed to see if said data contains bit image data along with a control code for specifying bit image printing, the presence of said control code and said bit image data being acknowledged if detected.

7. An image display device according to claim 1, wherein said control means checks received bit image data one bit at a time for a print dot, the presence of said print dot causing predetermined data to be written to a pixel position in said display memory means, said pixel position corresponding to each of the bits constituting said bit image data, the absence of said print dot causing logical zero to be written to said pixel position.

8. An image display device according to claim 1, wherein said control means checks received one byte of bit image data for a zero, the presence of said zero preventing said zero from being written to any of eight pixel positions in said display means, said eight pixel positions corresponding to said one byte.

9. An image display device according to claim 1, wherein said control means checks received bit image data one bit at a time for a print dot, the presence of said print dot causing predetermined data to be written to a pixel position in said display memory means, said pixel position corresponding to each of the bits constituting said bit image data, the absence of said print dot preventing logical zero from being written. to said pixel position.

10. An image display device according to claim 1, wherein said display memory means has a plurality of bits assigned per pixel to constitute a data configuration permitting multiple color representation by each pixel, said device further comprising a color conversion circuit whereby pixel data read from said display memory means is input and the display color of said pixel data is output after conversion to a desired color, said color conversion circuit being established so that said pixel data from said display memory means is output unchanged in color for display if said pixel data is specified for printing in a color other than black, said color conversion circuit being further established so that said pixel data from said display memory means is output in any desired color if said pixel data is any of two types of data, one type being data having printing in black specified thereto, the other type being background data with no printing specified thereto.

* * * * *